(12) United States Patent
Foley et al.

(10) Patent No.: US 10,128,008 B2
(45) Date of Patent: Nov. 13, 2018

(54) APPARATUS TO SWITCH ULTRASONIC SIGNAL PATHS IN A MODERATELY HIGH RADIATION AREA

(71) Applicant: WESTINGHOUSE ELECTRIC COMPANY LLC, Cranberry Township, PA (US)

(72) Inventors: Kevin J. Foley, Chattanooga, TN (US); Roy May, Hixson, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 811 days.

(21) Appl. No.: 13/834,432

(22) Filed: Mar. 15, 2013

(65) Prior Publication Data

US 2014/0098923 A1    Apr. 10, 2014

Related U.S. Application Data

(60) Provisional application No. 61/711,241, filed on Oct. 9, 2012.

(51) Int. Cl.
  *G21C 17/003*   (2006.01)
  *G21C 17/013*   (2006.01)
  (Continued)

(52) U.S. Cl.
  CPC ......... *G21C 17/003* (2013.01); *G21C 17/007* (2013.01); *G21C 17/013* (2013.01); *G21F 3/00* (2013.01)

(58) Field of Classification Search
  CPC .................................................. G21C 17/003
  (Continued)

(56) References Cited

U.S. PATENT DOCUMENTS 3,150,294 A * 9/1964 Dastidar .................. G05B 9/02
                                                      327/482
4,149,935 A * 4/1979 Fields ...................... H02G 1/10
                                                      376/249
(Continued)

FOREIGN PATENT DOCUMENTS

JP    H08211026 A    8/1996
JP    H10123256 A    5/1998
(Continued)

OTHER PUBLICATIONS

Teledyne Relays, "Series RF300/RF303," 2010, pp. 1-6.*
(Continued)

*Primary Examiner* — Sharon M Davis
(74) *Attorney, Agent, or Firm* — Joseph C. Spadacene; Westinghouse Electric Company LLC

(57) ABSTRACT

The invention relates to an apparatus and methods for operation in relatively high radiation fields to remotely switch signal devices through a shared single main umbilical signal cable. The invention is particularly suitable for use in a nuclear reactor, such as a boiling water reactor, and in difficult to access areas in the reactor pressure vessel. One or more main umbilical cables connect a control station to an enclosure housing a signal switching device. The signal switching device allows several signal generating/receiving devices, such as cameras and ultrasonic probes, to be controlled by the one or more main umbilical cables.

11 Claims, 3 Drawing Sheets

(51) Int. Cl.
*G21C 17/007* (2006.01)
*G21F 3/00* (2006.01)

(58) Field of Classification Search
USPC .......................................................... 376/259
See application file for complete search history.

(56) References Cited

U.S. PATENT DOCUMENTS

| | | | | |
|---|---|---|---|---|
| 4,169,758 A | * | 10/1979 | Blackstone | G21C 17/01 348/83 |
| 4,463,382 A | * | 7/1984 | Pellegrini | H04N 5/44 348/706 |
| 4,716,297 A | * | 12/1987 | Wills | G02B 6/421 250/551 |
| 5,132,968 A | * | 7/1992 | Cephus | H04W 52/0219 340/539.1 |
| 5,281,932 A | * | 1/1994 | Even-Or | H01P 5/02 333/32 |
| 5,568,527 A | * | 10/1996 | Richardson | G21C 17/003 376/210 |
| 5,712,886 A | | 1/1998 | Baldy | |
| 6,400,903 B1 | * | 6/2002 | Conoval | H04N 5/23206 348/E5.043 |
| 6,886,407 B1 | * | 5/2005 | Fredenberg | G01N 29/262 73/622 |
| 2002/0071513 A1 | | 6/2002 | Uckert | |
| 2006/0015294 A1 | | 1/2006 | Yetter, Jr. et al. | |
| 2012/0249811 A1 | | 10/2012 | Ganahl | |

FOREIGN PATENT DOCUMENTS

| | | |
|---|---|---|
| JP | 2003130859 A | 5/2003 |
| JP | 3720928 B2 | 11/2005 |
| JP | 2009139310 A | 6/2009 |
| JP | 2012003482 A | 1/2012 |
| JP | 2012157553 A | 8/2012 |
| KR | 2020080002448 | 7/2008 |
| WO | 95/14321 A1 | 5/1995 |

OTHER PUBLICATIONS

International Preliminary Report on Patentability for PCT/US2013/063621 dated Apr. 23, 2015 (Forms PCT/IB/326, PCT/IB/373, PCT/ISA/237).
International Search Report and Written Opinion of the International Searching Authority for PCT/US2013/063621 dated Jul. 10, 2014 (Forms PCT/ISA/220, PCT/ISA/210, PCT/ISA/237).
European Patent Office, Extended European Search Report for European Application No. 13865092.4, dated May 10, 2016.

* cited by examiner

APPARATUS TO SWITCH ULTRASONIC SIGNAL PATHS IN A MODERATELY HIGH RADIATION AREA

CROSS-REFERENCE TO RELATED APPLICATIONS

This application claims priority under 35 U.S.C. Section 119(e) from Provisional Application 61/711,241, entitled "Apparatus and Method to Switch Ultrasonic Signal Paths in a Moderately High Radiation Area" filed on Oct. 9, 2012.

FIELD OF THE INVENTION

This invention relates in general to apparatus and methods to remotely switch signal devices which are operated in relatively high radiation fields in a nuclear reactor, such as a boiling water reactor.

BACKGROUND OF THE INVENTION

Inspecting and repairing nuclear boiling water reactors typically consist of manually controlled poles and ropes to manipulate servicing devices and/or positioning of these devices. Remote operation is preferred, and sometimes mandatory, due to the safety risks associated with radiation within the rector. During reactor shut down, servicing of some components require installation of inspection manipulators or devices 30 to 100 feet deep within reactor coolant. The inspection manipulators or devices are connected to a remote control station via umbilical cables. The umbilical cables are costly and cumbersome to install and remove. The individual signal conductors must also be relatively large to improve the signal to noise ratio considering the length of umbilical required. In addition to the high cost, the larger size of the umbilical cables can impede access to locations within the reactor having limited areas of access. Smaller umbilicals provide improved manipulator access and maneuverability. In addition, the umbilical cables tend to be a source of radiation and contamination exposure to personnel from handling. In some cases, fewer manipulator installations can be performed and if a smaller umbilical is utilized on the manipulators, personnel handling and exposure is decreased. The idea of utilizing signal multiplexers is not necessarily new. However, typical multiplexer technology utilizes semiconductors which are susceptible to radiation damage and therefore, may not be utilized with the high radiation levels within the reactor. In addition, conventional signal devices (e.g., ultrasonic probes) do not require a significant number of signal conductors which would create a desire for multiplexing. Although, recent technological advances in some signal devices such as ultrasonic probes and video cameras, require more signal conductors than previous technology which drives the desire for multiplexing. For example, phased array ultrasonic probes require significantly more conductors to operate. The number of conductors can be over 128 times the amount required for conventional ultrasonic probes. With a drive to utilize phased array ultrasonics and thus, more main umbilical signal cables, the desire for multiplexing or switching has increased.

In general, a boiling water nuclear reactor produces electrical power by heating water in a reactor vessel that contains a nuclear fuel core in order to generate steam which is used in turn to drive a steam turbine. FIG. 1 shows a general arrangement of a reactor pressure vessel (RPV) 4. Feedwater is admitted into the RPV 4 via a feedwater inlet (not shown) and a feedwater sparger 6, which is a ring-shaped pipe having suitable apertures for circumferentially distributing the feedwater inside the RPV 4. The feedwater from sparger 6 flows downwardly through the downcomer annulus 8, which is an annular region between a core shroud 2 and RPV 4.

The core shroud 2 is a stainless steel cylinder surrounding the nuclear fuel core, the location of which is generally designated by numeral 9 in FIG. 1. The core is made up of a plurality of fuel bundle assemblies. Each array of fuel bundle assemblies is supported at the top by a top guide and at the bottom by a core plate (neither of which are shown). The core top guide provides lateral support for the top of the fuel assemblies and maintains the correct fuel channel spacing to permit control rod insertion.

The water flows through downcomer annulus 8, around the bottom edge of the shroud and into the core lower plenum 11. The water subsequently enters the fuel assemblies, wherein a boiling boundary layer is established. A mixture of water and steam enters core upper plenum 13 under the shroud head 15. The steam-water mixture than flows through vertical standpipes (not shown) atop the shroud head and enters steam separators (not shown), which separate liquid water from steam. The liquid water then mixes with feedwater in the mixing plenum, which mixture then returns to the core via the downcomer annulus 8. The steam is withdrawn from the RPV 4 via a steam outlet.

The BWR also includes a coolant recirculation system which provides the forced convection flow through the core necessary to attain the required power density. A portion of the water is sucked from the lower end of the downcomer annulus 8 via recirculation water outlet (not visible in FIG. 1) and forced by a centrifugal recirculation pump (not shown) into jet pump assemblies 19 (two of which are shown in FIG. 1) via recirculation water inlets 21. The BWR has two recirculation pumps, each of which provides the driving flow for a plurality of jet pump assemblies. The jet pump assemblies are circumferentially distributed around the core shroud 2.

Components and structures in the reactor pressure vessel need to be examined periodically to determine their structural integrity and the need for repair. Ultrasonic inspection is a known technique for detecting and sizing cracks in nuclear reactor components. An inspection area of primary interest is the outside surface of the cylindrical core shroud. However, the core shroud is difficult to access. Installation access is limited to the annular space between the outside of the shroud and the inside of the reactor pressure vessel, between adjacent jet pumps. Scanning operation access is additionally restricted within the narrow space between the shroud and jet pumps. The inspection areas are highly radioactive, and are located under water 50 to 65 feet below the operator's work platform.

An object of this invention is to provide an apparatus and methods that allow the manipulator operations to position devices in various difficult to access areas having relatively high radiation fields, and for several signal generating/receiving devices to be controlled by a main umbilical cable.

SUMMARY OF THE INVENTION

The invention provides apparatus and methods for inspecting reactor internal components in a reactor vessel. In one aspect, the invention provides an apparatus to remotely switch at least one signal generating/receiving device in a radiation field of a light water reactor. The apparatus includes an enclosure to house a signal switching device.

The enclosure includes an outer surface and a cavity formed by the outer surface, one or more input connectors mounted to the outer surface, and one or more output connectors mounted to the outer surface. The apparatus further includes a signal switching device positioned within the cavity, an umbilical signal cable connected to each of the one or more input connectors to connect the signal switching device to a control station, and the at least one signal generating/receiving device connected to the one or more output connectors.

The signal switching device can include at least one printed circuit board and a plurality of relay switches mounted thereto, and the relay switches can be mounted in parallel or in series.

The printed circuit board can utilize stripline or microstrip technology. The at least one signal generating/receiving device can be selected from a camera, an ultrasonic sensor and phased array ultrasonic probes.

There can be three input connectors mounted to the enclosure and three umbilical signal cables connected to the three input connectors, and five output connectors mounted to the enclosure and five signal generating/receiving devices connected to the five output connectors.

The enclosure can be immersed underwater.

The switching devices can include coiled relays, and can be designed for high frequency radio waves. Further, the switching devices can be Double Pole Double Throw signal switches, and can be 50 ohm matched impedance signal switches.

Furthermore, the at least one printed circuit board can contain board-mounted coaxial conductor connectors.

In another aspect, the invention provides a method for remotely switching at least one signal device in a radiation field in a light water nuclear reactor. The method includes providing an enclosure having a bottom, top and side walls to form a cavity therein, providing a signal switching device, positioning the signal switching device in the cavity of the enclosure, mounting one or more input connectors to at least one of the walls of the enclosure, mounting one or more output connectors to at least one other of the walls of the enclosure, obtaining at least one umbilical signal cable, connecting the at least one umbilical signal cable to the one or more input connectors to connect the signal switching device to a control station, connecting the first end of the at least one umbilical signal cable to a control station, providing at least one signal device, connecting the at least one signal device to the one or more output connectors, and controlling the at least one signal device with the at least one umbilical signal cable.

BRIEF DESCRIPTION OF THE DRAWINGS

A further understanding of the invention can be gained from the following description of the preferred embodiments when read in conjunction with the accompanying drawings in which.

DETAILED DESCRIPTION OF THE PREFERRED EMBODIMENTS

The invention relates to apparatus and methods to remotely switch signal devices through a shared main umbilical signal cable. A main umbilical connects a control station to an enclosure, e.g., a junction box, which houses a signal switching device. The signal switching device allows several signal generating/receiving devices, e.g., cameras, ultrasonic sensors, phased array ultrasonic probes and the like, to be controlled by a main umbilical cable. Further, the device can be operated in relatively high radiation fields in which conventional multiplexer devices may not be operable.

In certain embodiments, a single main umbilical cable may be employed. In other embodiments, more than one main umbilical cable can be employed.

Figure 1:
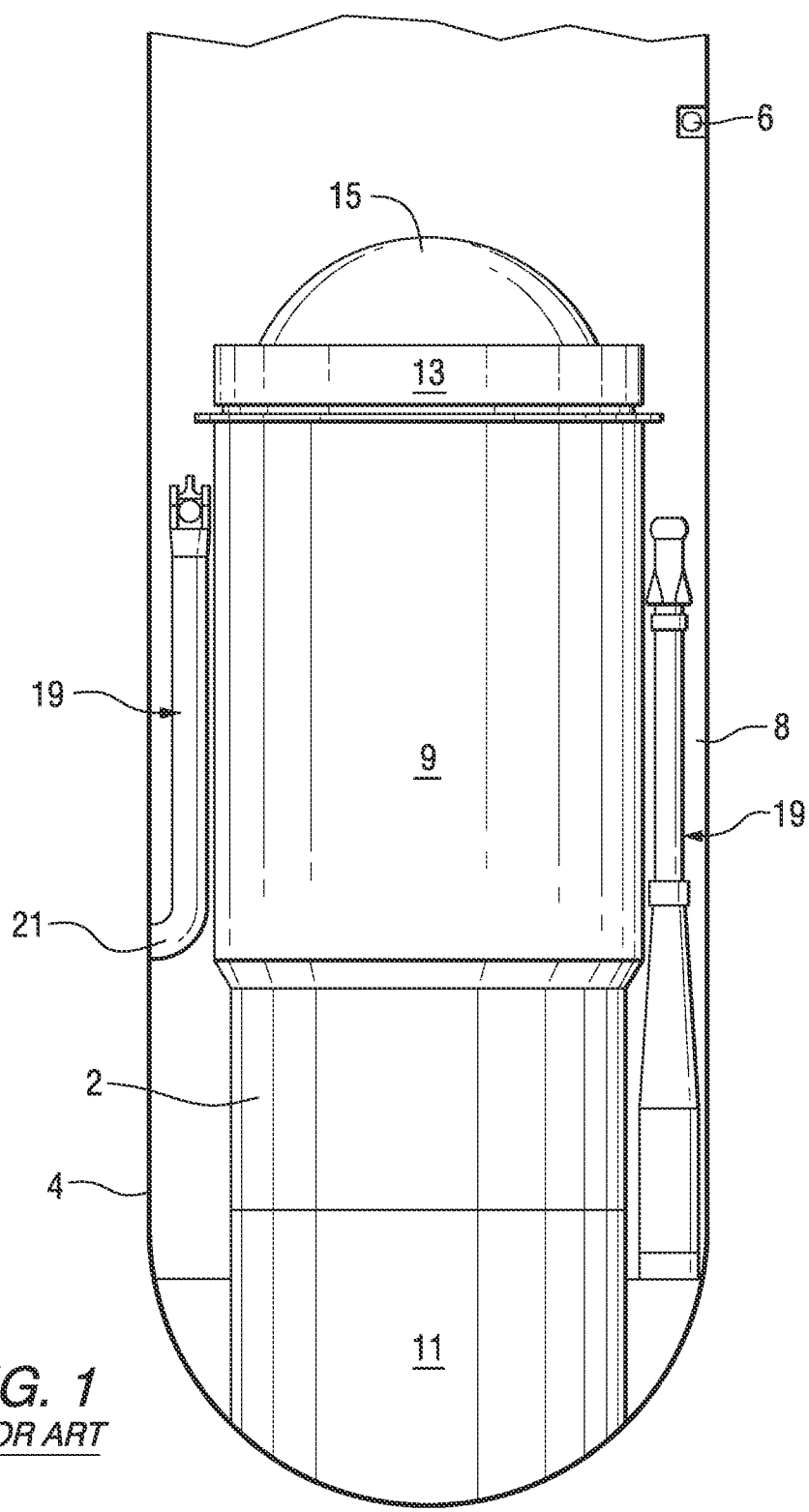
FIG. 1 is a schematic showing an elevational view of pertinent portions of a conventional BWR.
Figure 2:
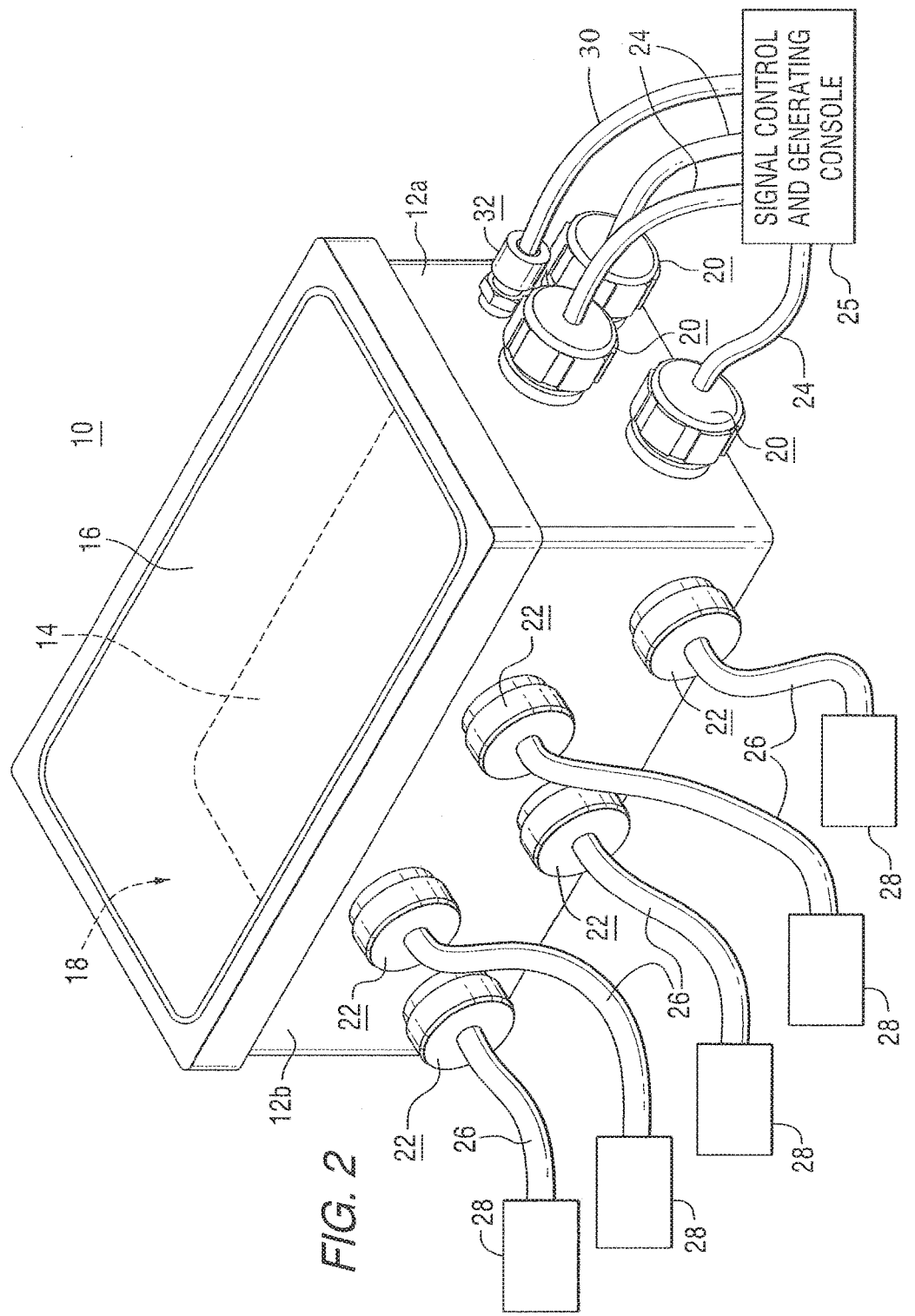
FIG. 2 is an enclosure for housing a signal switching device, in accordance with certain embodiments of the invention.

Referring to FIG. 2, there is illustrated an enclosure 10 in accordance with certain embodiments of the invention. The enclosure 10 has four walls including a first wall 12a and a second wall 12b (two of the walls are not shown), a bottom surface 14, and a top cover 16, which form a cavity 18 therein.

In alternate embodiments, the enclosure can include a wide variety of shapes, such as but not limited to pyramids, octagonal, hexagonal, and cylindrical or the like. For example in the embodiment wherein the enclosure is cylindrical in shape, the enclosure includes a cylindrical tube, a removable cover, an opposing cover, a cavity formed by this structure, one or more input connectors mounted to at least one surface, and one or more output connectors mounted to at least one other surface.

The enclosure 10 (as shown in FIG. 2) can be constructed of a material that is suitable for use in light water nuclear reactors, such as boiling water reactors. Therefore, the enclosure 10 is suitable for use in areas of radiation and also is suitable for immersion underwater. A signal switching device (not shown) is disposed within the cavity 18. Suitable signal switching devices for use in the invention include those known in the art which include at least one printed circuit board and a plurality of relay switches.

In certain embodiments, the switching devices can include coiled relays, and can be designed for high frequency radio waves. Further, the switching devices can be Double Pole Double Throw signal switches, and can be 50 ohm matched impedance signal switches.

Furthermore, the at least one circuit board can contain board-mounted coaxial conductor connectors.

The top cover 16 is attachable to the four walls and is removable to insert and remove the signal switching device. The first wall 12a has mounted thereto three input connectors 20. It is contemplated that more or less input connectors 20 may be employed. One end of umbilical signal cables 24 is attached to each of the input connectors 20 and the other end of the umbilical signal cables 24 is attached to a signal control and generating console 25. The second wall 12b has mounted thereto five output connectors 22. It is also contemplated that more or less output connectors 22 may be employed. The output connectors 22 are connected to at least one signal generating/receiving device 28, such as a camera or ultrasonic sensor, via output cables 26. Also, a switch control cable 30 connects the console 25 with a connector 32 on the enclosure 10.

Each main umbilical cable assembly serves as a bi-directional signal cable input to the signal switching device and serves as a bi-directional signal cable output from equipment in the control station. Each main umbilical cable can contain a plurality of coaxial cable conductors with contact dense overmolded connectors.

The enclosure also facilitates a transition from small flexible micro coaxial cabling connected to the signal device, to larger coaxial cables connected to the control console. The micro-coaxial cables can be connected between the enclosure switch box and the signal device (e.g. phased array ultrasonic probe) to allow for compact design and flexible manipulator movement. However, these micro-coaxial cables results in severely attenuated excitation pulses and returning signals if utilized for long cable lengths. Therefore, larger coaxial cables may be connected between the enclosure and the control console to minimize overall signal attenuation and obtain an acceptable signal to noise ratio.

Figure 3:
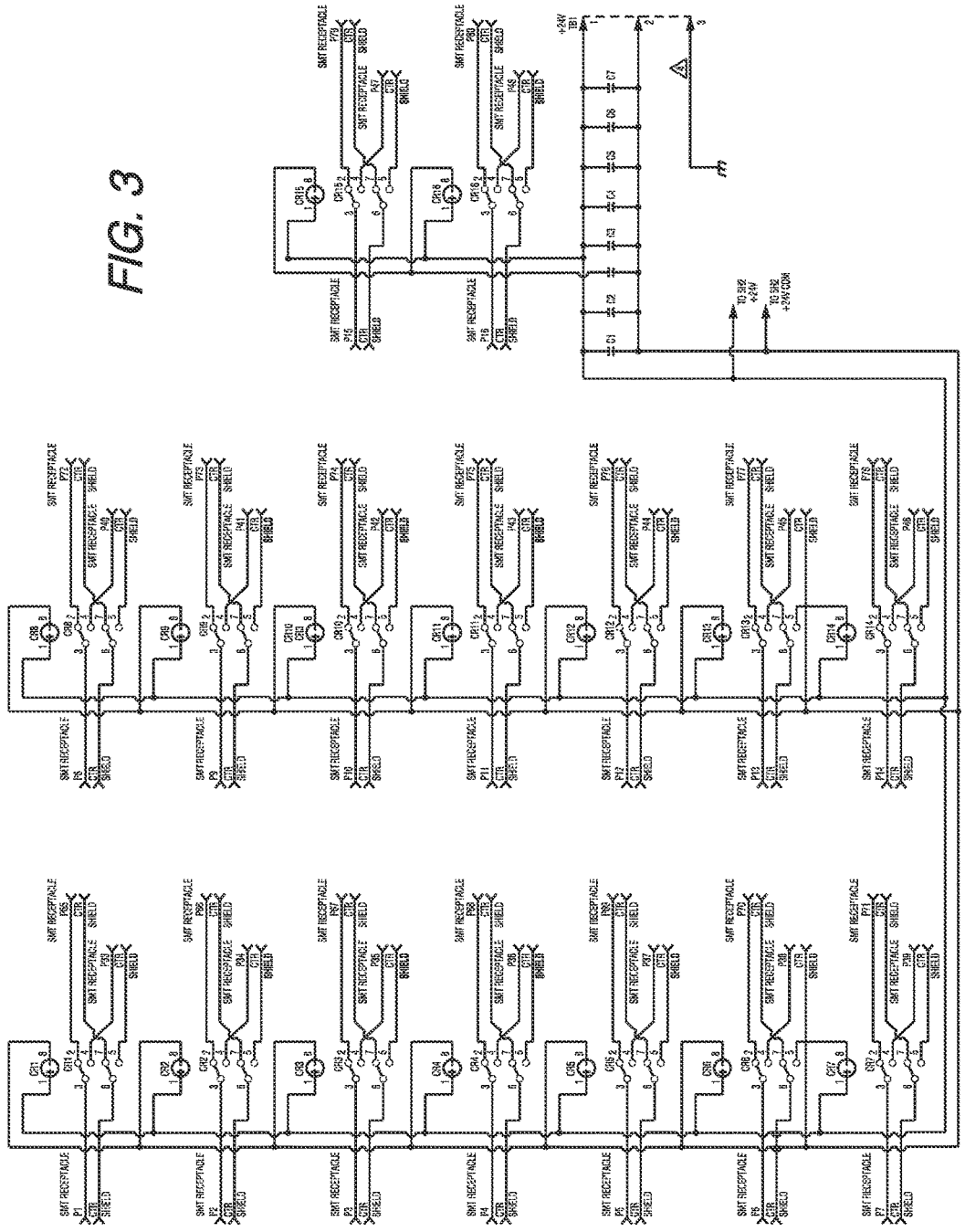
FIG. 3 is a schematic of a circuit for use in a signal switching device, in accordance with certain embodiments of the invention.

The signal switch device can be of various designs and configurations known in the art. Referring to FIG. 3, there is illustrated an example of a circuit that may be utilized in the signal switching device and contained within the enclosure 10 of the invention.

In certain embodiments, the invention includes the following features. There is employed an enclosure to house a signal switching device. The enclosure is suitable for use in relatively high radiation areas and can be immersed underwater. The signal switching device includes three printed circuit boards, each containing thirty-two coaxial microchip relay switches with pluggable coaxial connectors which are soldered to the printed circuit boards. The printed circuit boards utilize stripline technology and relays that match impedance for phased array applications. Metal can relay may also be used to provide shielding from outside electromagnetic interference. Individual coaxial connections at the printed circuit boards may also be utilized to provide the impedance matching and minimize the signal run lengths on the printed circuit boards. Three coaxial cables are connected to each of the relays with the opposing ends of the cables soldered to contact dense underwater connectors mounted and sealed within the enclosure. In certain embodiments, three main umbilical cable assemblies are connected to the underwater enclosure. Each main umbilical cable contains thirty-two coaxial cable conductors with contact dense overmolded under water connectors. The signal switching device also includes five contact dense underwater connectors utilized as the output from the signal switching device. These contact dense connectors are attached to the signal output device (e.g., ultrasonic sensors).

The relay switches of the signal switching device are controlled remotely from the control station. The relay switches can be wired in parallel or in series to provide additional outputs for a given input. In certain embodiments, the relay switches are wired in parallel to create two outputs per each input and to minimize the risk of signal attenuation associated with each relay. In alternate embodiments, the relay switches are wired in series to split each output into an input into another relay. If two layers of relays are utilized in series, each input would utilize three relays and create four outputs. If three layers of relays are utilized in series, each input would utilize seven relays and create 8 outputs. The relays switch controls are tied together such that a single control signal will switch all of the relays on each of the printed circuit boards. Thus, only four conductors are required to control three individually controlled printed circuit boards each with 32 coaxial signal relay switches. There is one conductor for each individual control contact per board and one shared conductor for power. In an alternative embodiment, a single control conductor can be utilized to switch all relays together The signal switch device above-described illustrates an embodiment of the invention whereby three inputs, three printed circuit boards, thirty-two switches per board, five outputs are utilized and wired in parallel, and contained within an enclosure. However, it is contemplated that a wide variety of combinations of inputs, outputs, switches, or wiring in series can be utilized to accommodate the needs of specific manipulators, in accordance with other embodiments of the invention.

The types of components utilized in this signal switch device are passive components with coiled relays because they are not as susceptible to radiation induced failures. Modern technology may utilize transistor-based components which are more susceptible to radiation failures. However, modern technology has reduced the size and increased the robustness of relay and printed circuit board technology which made the development and deployment of this device more feasible given the operating conditions within a nuclear reactor, such as one or more of temperature, size, power requirements and cost.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

The invention claimed is:

1. An apparatus to remotely switch a signal switching device in a light water nuclear reactor, the apparatus comprising:
   an underwater immersible junction box, comprising:
      an outer surface;
      a cavity formed by the outer surface;
      a cover attachable to, and removable from, the outer surface;
      one or more input connectors mounted to the outer surface; and
      one or more output connectors mounted to the outer surface,
   wherein the junction box houses the signal switching device, comprising:
      at least one printed circuit board; and
      a plurality of relay switches mounted to the at least one printed circuit board;
   a control station remotely located from the junction box;
   more than one signal generating/receiving devices remotely located from the junction box and the control station;
   one or more output cables coupled to the one or more output connectors to connect the junction box to the more than one signal generating/receiving devices;
   one or more main umbilical signal cables correspondingly coupled to the one or more input connectors to connect the control station to the junction box, wherein each of the one or more main umbilical signal cables serves as a bi-directional signal cable input to the signal switching device and serves as a bi-directional signal cable output from the control station, each of the one or more main umbilical signal cables comprising a plurality of coaxial cable conductors that connect to the plurality of relay switches,
   wherein the control station is configured to send a single signal through the one or more umbilical signal cables to the plurality of relay switches, the single signal being configured to switch all of the plurality of relay switches mounted on each of the at least one printed circuit board, and in turn, the more than one signal generating/receiving devices, and wherein, said more than one signal generating/receiving devices are located in a radiation field of the light water nuclear reactor.

2. The apparatus of claim 1, wherein the relay switches are mounted in parallel.

3. The apparatus of claim 1, wherein the at least one printed circuit board utilizes stripline or microstrip impedance matching technology.

4. The apparatus of claim 1, wherein the more than one signal generating/receiving devices are selected from the group consisting of a camera and ultrasonic sensor.

5. The apparatus of claim 4, wherein the ultrasonic sensor is one or more phased array ultrasonic probes.

6. The apparatus of claim 1, wherein there are three input connectors mounted to the enclosure and three main umbilical signal cables correspondingly connected to the three input connectors.

7. The apparatus of claim 1, wherein there are five output connectors mounted to the enclosure and five signal generating/receiving devices correspondingly connected to the five output connectors.

8. The apparatus of claim 1, wherein the light water reactor is a boiling water reactor.

9. The apparatus of claim 1, wherein the switching device is Double Pole Double Throw (DPDT) signal switches.

10. The apparatus of claim 1, wherein the switching device is fifty ohm matched impedance signal switches.

11. The apparatus of claim 1, wherein the at least one printed circuit board contains board mounted coaxial conductor connectors.

* * * * *